United States Patent [19]

Wittrisch

[11] Patent Number: 5,080,168

[45] Date of Patent: Jan. 14, 1992

[54] DEVICE FOR LOCKING A CABLE PASSING ACROSS THE WALL OF A TUBE SUCH AS A SIDE-ENTRY SUB

[75] Inventor: Christian Wittrisch, Rueil-Malmaison, France

[73] Assignee: Institut Francais du Petrole, Malmaison, France

[21] Appl. No.: 596,014

[22] Filed: Oct. 11, 1990

[30] Foreign Application Priority Data

Oct. 11, 1989 [FR] France .................................. 8913379

[51] Int. Cl.$^5$ ............................................. E21B 17/00
[52] U.S. Cl. ..................................... 166/65.1; 166/242
[58] Field of Search ...................... 166/65.1, 242, 117.5

[56] References Cited

U.S. PATENT DOCUMENTS

| | | | |
|---|---|---|---|
| 4,200,297 | 4/1980 | Tricon | 166/65.1 X |
| 4,388,969 | 6/1983 | Marshall et al. | 166/65.1 X |
| 4,457,370 | 7/1984 | Wittrisch | 166/250 |
| 4,506,729 | 3/1985 | Davis, Jr. et al. | 166/242 X |
| 4,524,834 | 6/1985 | Barron et al. | 166/65.1 X |
| 4,603,578 | 8/1986 | Stoltz | 166/242 X |
| 4,607,693 | 8/1986 | Richardson | 166/65.1 X |
| 4,877,095 | 10/1989 | Wittrisch | 166/65.1 X |
| 4,913,227 | 4/1990 | Wittriseh | 166/65.1 X |

FOREIGN PATENT DOCUMENTS 2522059  8/1983  France .

Primary Examiner—Hoang C. Dang
Attorney, Agent, or Firm—Antonelli, Terry, Stout & Kraus

[57] ABSTRACT

A locking device allows a cable to be immobilized in translation in relation to a side wall entry sub inserted in a string of tubular elements taken down into a well bore as long as the tractive forces that can be applied to the cable remain limited. The locking device includes a tubular coupling made of two complementary parts which can be tightened around the cable with screws of a limited resistance and an insert fastened in a recess of the sub fitted with a cylindrical inner cavity which can contain the coupling and prevent its translation while leaving it free to turn around on itself. The insert is fitted with a mouthpiece adapted for releasing the cable from the coupling when a thrust load exerted on the cable is sufficient for breaking the screws.

3 Claims, 1 Drawing Sheet

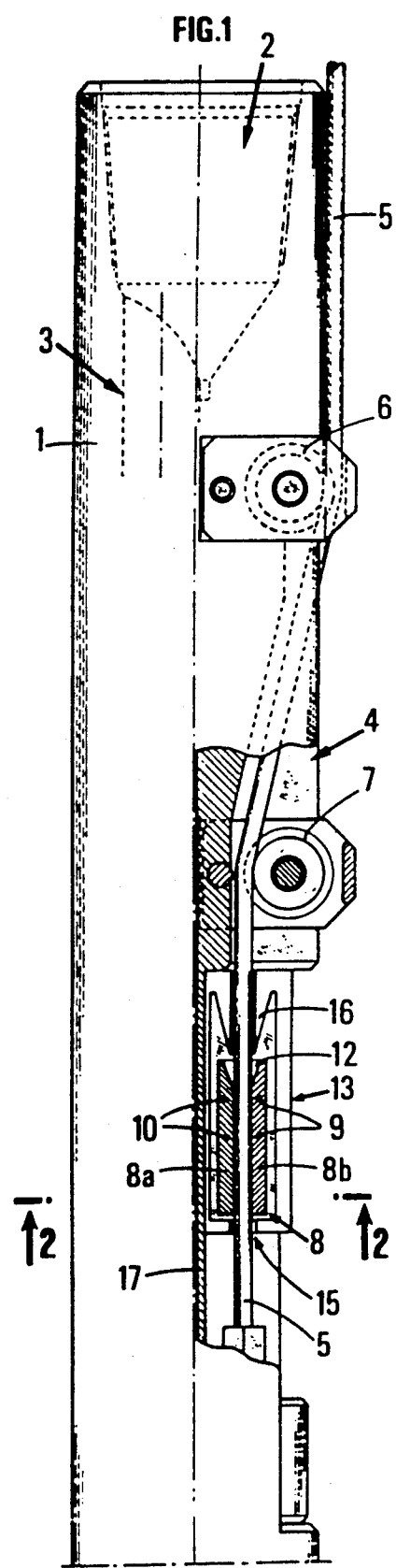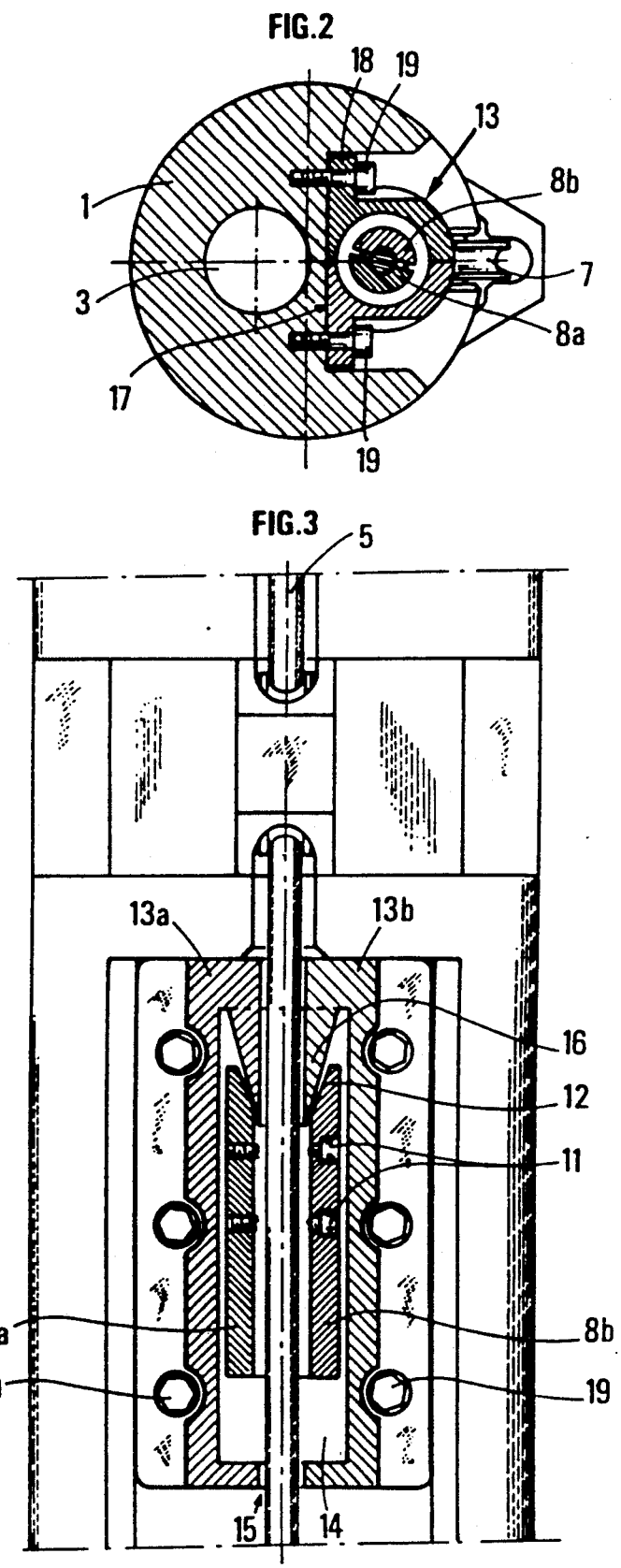

DEVICE FOR LOCKING A CABLE PASSING ACROSS THE WALL OF A TUBE SUCH AS A SIDE-ENTRY SUB

BACKGROUND OF THE INVENTION

The present invention relates to an improved device for providing the locking of a cable as it passes from one side to the other side of the wall of a tube.

The device according to the invention can be particularly utilized in a side-entry or a side-window sub set on a column taken down into a well such as a well bore or an oil-field development well.

Side-entry subs are well-known in the oil sphere. They are used for the passing of electric carrying cables linking a surface installation with a servicing tool at the bottom of a well bore such as a logging tool. Examples of such subs are for example described in French Patents 2,522,059 or 2,617,232. Such subs are used for example for carrying out loggings in horizontal wells or wells that are highly inclined with respect to the vertical. An appropriate sonde is fastened onto the end of a tubular element which is introduced into the well to be logged. By successively adding string sections, the column is extended until the sonde is brought to a given depth. The column which is constituted thereby is then added a side-entry sub across which is passed an electric carrying cable fitted with a socket connector that can be plugged in a liquid medium topped by a load bar. Through fluid pumping, the socket connector is pushed onto the bottom of the string where it plugs into a multi-contact plug that is placed to this effect above the sonde. The cable is then locked in the side-entry sub. The column is then completed by adding complementary string sections, with the cable outside the string, until the sonde in the lower end of the column reaches the inclined area where the measurings are to be carried out. This corresponds to a lowering depth of several hundreds to several thousands of meters. After connecting the cable to a surface control and recording laboratory, the logging measurings are generally achieved by taking the sonde and the associated column up along the area to be explored until the side-entry sub is brought back to the surface.

The locking of the cable in this sub is a practical necessity. Although the cable is rather rigid, its extension under the effect of the tractive stresses is relatively considerable. The extension may reach several meters and even about ten meters when the unwound length is several kilometers. It is therefore not possible to refer to the length of cable unwound from the storage reel in order to know with precision the working depth of the sonde. The total length of the column introduced into the well which is, for its part, much more rigid, is preferably measured and the cable is preferably displaced with the column by locking one in relation to the other at the level of the side-entry sub. The cable is taken up at the same time and at the same velocity as the rods while exerting on it a rather low (1,000 daN for example) constant mechanical stress so that its extension on several hundreds of meters is negligible. A precise measurement of the depth where the loggings are carried out is obtained thereby.

In practice, this locking is the source of certain difficulties, essentially because of the cable manufacturing procedure. It is spiral-shaped and made with twisted prestressed strands. The taking down of the sub where it is locked in translation and rotation, over several hundreds of meters, causes a stress relief of the coils of the cable which turns round on itself by 10 to 20 revolutions over a distance of 500 meters for example. When the sub is taken up, the part of the cable between the latter one and the reel becomes twisted in the opposite direction and progressively recovers its initial stress whereas the length on which the twisting occurs constantly decreases. Over the last meters, the torsional stress is often such that it damages the cable. The recurrence of these alternate stress reliefs and stresses eventually spoils it. This tendancy can especially be noticed when the cable that is used is new.

SUMMARY OF THE INVENTION

The cable locking device according to the invention avoids the drawbacks mentioned above. It can be placed on a tube, in order to lock a cable as it passes across the side wall of a tube, and notably in a side-entry sub in order to lock a multiwire cable linking during an operation a logging sonde taken down in a well at the end of a tubular string to a surface control and recording laboratory, this sub comprising an opening in its side wall and means for guiding the cable across the opening.

It is characterized by a tubular coupling, fastening elements for tightening the coupling around the cable and an insert forming a thrust or abutment in order to limit the translation of the coupling in relation to the sub and to allow its free rotation, the insert being innerly fitted, following its axis, with a beveled mouthpiece and the tubular coupling being fitted with a recess at one of its ends, the engaging of the mouthpiece into said recess of the coupling by translation of the cable having the effect of forcing the elements fastening the coupling onto the cable away from each other and of freeing the cable.

According to one embodiment, the insert is for example made of two juxtaposable pieces each one of which is fitted with a base adapted to be applied against a plane face of a recess provided in the sub, and with a beveled inner lip, as well as with fastening means for fastening the bases against the plane face so that the two parts are juxtaposed.

The device may comprise, for example, that is aligned with a guide path constituted by guide pulleys.

The device according to the invention, with the utilized cable coupling and insert, allows at the same time:
- to lock the cable in translation as long as the tractive forces exerted on it remain within certain limits defined by the construction, and
- to provide the cable with the possibility of turning round on itself in one direction or in the opposite direction during its unwinding and its rewinding, when the stresses exerted on the cable fall off, for example at times when the rigid column is extended or shortened.

The damages previously caused by the twisting in the previous subs are avoided thereby.

BRIEF DESCRIPTION OF THE DRAWINGS

Other features and advantages of the device according to the invention will be evident from the following detailed description of embodiments which are described by way of non limitative examples with reference to the accompanying drawings in which :

FIG. 1 shows a partial section of the upper part of a side-entry sub with a preferred embodiment of the cable locking device according to the invention;

FIG. 2 shows, on a larger scale, a section taken along line 2—2 device represented in FIG. 1; and FIG. 3 is a side view of the sub, of the same scale as the other figures, which shows the spacing of the sub under the effect of the mouthpiece of the insert forming a thrust or abutment, after a strong tractive stress has been exerted on the cable.

DESCRIPTION OF THE PREFERRED EMBODIMENTS

The device for locking a cable shown in FIG. 1 is included in a side-window sub adapted for being inserted between any two sections of a column made of a string of interconnected rods linked at the surface to an operation installation (not shown). To this effect, the sub is fitted at its upper end with a threaded conical bore 2 for the tip of a rod. A tip (not shown) completes the sub at its opposite end for its connecting to the following rod in the column. The sub is tubular. A longitudinal channel 3 goes right through it, linking the inside of the rods in the column on either side of the sub together. The sub is fitted, parallel to its longitudinal axis, with an extended recess 4. A multiwire cable 5 located outside the column enters into the column at the level of the sub. It is guided and diverted towards the inside of the recess by two guide rollers 6, 7 the axes of which are fastened to the sub.

The locking device according to the invention is located within recess 4. It comprises a tubular coupling 8 fitted with a central passageway with a section adapted to that of cable 5. The coupling is made of two complementary parts 8a and 8b (FIG. 2) which are placed on either side of the cable. Each part is fitted with threaded holes 9, 10 at different locations along the coupling for fastening screws 11 (FIG. 3) allowing to tighten it around the cable. Fastening screws 11 showing a limited resistance to the tractive stress are used. A conical recess 12 opening out towards the outside is provided in coupling 8 at one of its ends.

The locking device also comprises an insert 13 forming an abutment for the coupling. This insert 13 is fitted with a cylindrical cavity 14 with a section larger than that of coupling 8. At its two opposite ends, insert 13 comprises axial passageways 15 with a section which is smaller than the outer section of the coupling but which allows cable 5 to pass freely. The insert is innerly fitted with a mouthpiece 16 with a conical shape for example, the tip of which is pointed at the bottom of recess 12 in coupling 8. The mouthpiece 16 is sufficiently pointed for reaching the bottom of recess 12 and exerting on the two parts of coupling 8 radial forces which tend to separate one part from the other. A tractive stress on cable 5 brings recess 12 of the coupling to rest against mouthpiece 16 of part 13 and locks its translation. The locking is nevertheless only effective when the tractive stress on the cable is limited. Beyond a given limit determined by the construction, which causes the breaking of the fastening screws 11 of coupling 8 around cable 5, mouthpiece 16 forces the spacing of the two parts of the coupling, which releases the cable from any translation locking (FIG. 3).

Part 13 is fastened against a plane wall 17 inside recess 4 of sub 1. To this effect, part 13 is fitted with a base 18 that is applied against wall 17 and fastened to it through fastening screws 19. For greater mounting convenience, locking part 13 is made of two symmetric pieces juxtaposed by fastening against wall 17.

A conventional tightness system of the packer type (not shown) is arranged around cable 5 before it enters the inner passageway 3 of the sub, in order to isolate the inside of the tubular column from the well.

The shape of coupling 8 and of locking part 13 allows cable 5 to turn freely round on itself during the phase of taking the side-window sub down into the well and during its taking up.

I claim:

1. A locking device for locking a cable as the cable passes along the side wall of a side-entry sub, said cable operatively linking a logging tool taken down in a well at the end of a tubular column to a surface control and recording laboratory during operation, said sub comprising an opening in the side wall thereof a means for guiding the cable across the opening, said locking device comprising a tubular coupling provided with two opposite ends, fastening elements for tightening the coupling around the cable and an insert forming an abutment for limiting the translation of the coupling in relation to the sub and allowing free rotation thereof, the insert forming the abutment being fitted, along an axis thereof, with a beveled mouthpiece and the tubular coupling being fitted at one end thereof with a recess for engaging the mouthpiece; engagement of the mouthpiece into said recess of the coupling by translation of the cable having the effect of forcing the fastening elements away from each other and thereby freeing the cable.

2. A device as claimed in claim 1, wherein the insert comprises two juxtaposable parts, each part being fitted with a base adapted to be applied against a plane face defining a wall of the opening provided in the sub and with a beveled inner lip, as well as with fastening means for fastening each base against the plane face so that the two parts of the insert are juxtaposed.

3. A device as claimed in any of the preceding claims, wherein the guiding means comprise two pulleys arranged to bring the cable in alignment with the insert.

* * * * *